(12) United States Patent
Ide

(10) Patent No.: US 6,363,476 B1
(45) Date of Patent: Mar. 26, 2002

(54) MULTIPLY-ADD OPERATING DEVICE FOR FLOATING POINT NUMBER

(75) Inventor: Nobuhiro Ide, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/372,135

(22) Filed: Aug. 11, 1999

(30) Foreign Application Priority Data

Aug. 12, 1998 (JP) .......................................... 10-228267

(51) Int. Cl.$^7$ ............................................. G06F 9/302
(52) U.S. Cl. ...................................... 712/222; 708/501
(58) Field of Search .............................. 708/501, 512, 708/513, 514; 712/222; 345/643, 644

(56) References Cited

U.S. PATENT DOCUMENTS

| | | | | |
|---|---|---|---|---|
| 4,825,400 A | * | 4/1989 | Simonic et al. ............. | 708/505 |
| 5,247,471 A | * | 9/1993 | Hilker et al. ................ | 708/505 |
| 5,590,365 A | * | 12/1996 | Ide et al. ..................... | 712/218 |
| 5,943,249 A | * | 8/1999 | Handlogton ................ | 708/496 |
| 5,957,997 A | * | 9/1999 | Olson et al. ................ | 708/205 |
| 6,049,865 A | * | 4/2000 | Smith .......................... | 712/222 |

* cited by examiner

Primary Examiner—William M. Treat
(74) Attorney, Agent, or Firm—Foley & Lardner

(57) ABSTRACT

A floating point multiply-add operating device in which a critical path in an addition process of continuous multiply-add operations of floating point numbers is shortened to improve operation efficiency is disclosed. This operating device includes: an exponent operating section for comparing an exponent of a floating point number of an operation result of a preceding multiply-add operation n with an exponent of a multiplication result of a subsequent multiply-add operation (n+1), and calculating an alignment shift count of the multiply-add operation (n+1) by the comparison result; and a mantissa operating section for aligning one mantissa of mantissas of two operands according to the alignment shift count inputted from the exponent operating section, calculating a sum of an aligned mantissa of the operand and the mantissa of the other operand, and normalizing a calculated addition result of the mantissas as needed, thereby calculating a mantissa of the multiply-add operation (n+1). The alignment shift count is obtained by starting calculation of an alignment shift count of the subsequent multiply-add operation (n+1) before normalization of the preceding multiply-add operation n is finished.

8 Claims, 12 Drawing Sheets

FIG. 3
PRIOR ART

| PROCESSING PHASE | PROCESS CONTENTS | | |
|---|---|---|---|
| | EXPONENT | MANTISSA | |
| (1) MULTIPLICATION | $Em' \leftarrow Ea + Eb - Ei$ | $Fm' \leftarrow Fa \times Fb$ | STAGE X1 |
| (2) NORMALIZATION | $Em \leftarrow Em' + 1$ | $Fm \leftarrow shift(Fm', 1, r)$ | STAGE X2 |

FIG. 4
PRIOR ART

| PROCESSING PHASE | PROCESS CONTENTS | | |
|---|---|---|---|
| | EXPONENT | MANTISSA | |
| (1) ALIGNMENT SHIFT COUNT CALCULATION | $S \leftarrow \|Em - Ec\|$ | | STAGE A1 |
| (2) SWAP | $Ed \leftarrow \max(Em, Ec)$ | SWAP | |
| (3) ALIGNMENT | | $Fst \leftarrow shift(Ft, S, r)$ | |
| (4) ADDITION /SUBTRACTION | | $Fs \leftarrow Fss + Fst$ | STAGE A2 |
| (5) NORMALIZATION NUMBER CALCULATION | $Ec \leftarrow Ed - N$ | $N \leftarrow PriorityEncode(Fs)$ | |
| (6) NORMALIZATION | | $Fn \leftarrow shift(Fs, N, \ell)$ | |

FIG. 5
PRIOR ART

| INSTRUCTION | EXECUTION TIME | | | | | | |
|---|---|---|---|---|---|---|---|
| | T−6 | T−5 T−4 | T−3 T−2 | T−1 | T | T+1 | |
| ⋯ | | | | | | | |
| MULTIPLY-ADD OPERATION(n−1) | | X1 X2 A1 | (A2) | | | | TRANSFER OF ACCUMULATION RESULT VIA *3 AND *4<br>TRANSFER OF PRODUCT VIA *1 AND *2 |
| MULTIPLY-ADD OPERATION n | | | X1 (X2) (A1) | A2 | | | TRANSFER OF ACCUMULATION RESULT VIA *3 AND *4<br>TRANSFER OF PRODUCT VIA *1 AND *2 |
| MULTIPLY-ADD OPERATION(n+1) | | | NOP | X1 X2 | A1 A2 | | |
| ⋯ | | | | | | | |

FIG. 7

| INSTRUCTION | EXECUTION TIME | | | | |
|---|---|---|---|---|---|
| | | T−3 | T−2 | T−1 | T | T+1 |
| ...... | | | | | | |
| PRECEDING | MULTIPLY-ADD OPERATION(n−1) | X | Y | Z | | |
| PRESENT | MULTIPLY-ADD OPERATION n | | X | Y | Z | |
| SUBSEQUENT | MULTIPLY-ADD OPERATION(n+1) | | | X | Y | Z |
| ...... | | | | | | |

FIG. 8

| TIME | MULTIPLY-ADD OPERATION n | MULTIPLY-ADD OPERATION (n+1) |
|---|---|---|
| T | (EXPONENT)<br>ALIGNMENT SHIFT COUNT CALCULATION<br><br>(MANTISSA)<br>SWAP, ALIGNMENT<br>ADDITION/SUBTRACTION,<br>NORMALIZATION NUMBER CALCULATION<br>NORMALIZATION | |
| T+1 | NORMALIZATION | (EXPONENT)<br>ALIGNMENT SHIFT COUNT CALCULATION<br><br>(MANTISSA)<br>SWAP, ALIGNMENT<br>ADDITION/SUBTRACTION,<br>NORMALIZATION NUMBER CALCULATION<br>NORMALIZATION |

FIG. 9

| TIME | | |
|---|---|---|
| | MULTIPLY-ADD OPERATION n | MULTIPLY-ADD OPERATION (n+1) |
| | (EXPONENT)  (MANTISSA) ALIGNMENT SHIFT COUNT CALCULATION((1)-a) ALIGNMENT SHIFT COUNT CALCULATION((1)-b) | |
| T | SWAP, ALIGNMENT ADDITION/SUBTRACTION, NORMALIZATION NUMBER CALCULATION NORMALIZATION   NORMALIZATION | (EXPONENT)  (MANTISSA) ALIGNMENT SHIFT COUNT CALCULATION((1)-a) ALIGNMENT SHIFT COUNT CALCULATION((1)-b) |
| T+1 | | SWAP, ALIGNMENT ADDITION/SUBTRACTION, NORMALIZATION NUMBER CALCULATION NORMALIZATION   NORMALIZATION |

FIG. 10

| TIME | MULTIPLY-ADD OPERATION(n−1) | MULTIPLY-ADD OPERATION n | MULTIPLY-ADD OPERATION(n+1) |
|---|---|---|---|
| T−1 | (1) ALIGNMENT SHIFT COUNT CALCULATION<br>(2) SWAP<br>(3) ALIGNMENT<br>(4) ADDITION/SUBTRACTION<br>(5) NORMALIZATION NUMBER CALCULATION<br>(6) NORMALIZATION | | |
| T | | (1) ALIGNMENT SHIFT COUNT CALCULATION<br>(2) SWAP<br>(3) ALIGNMENT<br>(4) ADDITION/SUBTRACTION<br>(5) NORMALIZATION NUMBER CALCULATION<br>(6) NORMALIZATION | |
| T+1 | | | (1) ALIGNMENT SHIFT COUNT CALCULATION<br>(2) SWAP<br>(3) ALIGNMENT<br>(4) ADDITION/SUBTRACTION<br>(5) NORMALIZATION NUMBER CALCULATION<br>(6) NORMALIZATION |

FIG. 11

| TIME | MULTIPLY-ADD OPERATION(n−1) | MULTIPLY-ADD OPERATION n | MULTIPLY-ADD OPERATION(n+1) |
|---|---|---|---|
| T−2 | (1) ALIGNMENT SHIFT COUNT CALCULATION | | |
| T−1 | (2) SWAP<br>(3) ALIGNMENT<br>(4) ADDITION/SUBTRACTION<br>(5) NORMALIZATION NUMBER CALCULATION<br>(6) NORMALIZATION | (1) ALIGNMENT SHIFT COUNT CALCULATION | |
| T | | (2) SWAP<br>(3) ALIGNMENT<br>(4) ADDITION/SUBTRACTION<br>(5) NORMALIZATION NUMBER CALCULATION<br>(6) NORMALIZATION | (1) ALIGNMENT SHIFT COUNT CALCULATION |
| T+1 | | | (2) SWAP<br>(3) ALIGNMENT<br>(4) ADDITION/SUBTRACTION<br>(5) NORMALIZATION NUMBER CALCULATION<br>(6) NORMALIZATION |

MULTIPLY-ADD OPERATING DEVICE FOR FLOATING POINT NUMBER

BACKGROUND OF THE INVENTION

1. Field of the Invention

The present invention relates to a multiply-add operating device for a floating point number. More particularly, the present invention relates a technique for realizing an improvement in operation efficiency by shortening a critical path for an accumulative adding process of continuous multiply-add operations in a multiply-add operating device which executes a multiply-add operation of floating point numbers by a multiplication process and an addition process for accumulating multiplication results.

2. Description of the Background Art

In recent years, with the rapid spread of multimedia and the spread of video games using advanced GUI (Graphic User Interface) graphics, computer graphic (CG) techniques have been more important. In particular, by the rapid spread of personal computers and video game machines to homes, a demand on a three-dimensional computer graphics (3D-CG) application serving as an application operating on a high-performance processor, especially, a high-quality moving-picture application has been increasing. These CG processes requires an enormous amount of calculation and high calculation performance. Here, a geometrical process in the CG is a phase in which a transformation process or an illumination process of a geometrical graphic model such as coordinate transformation or viewpoint transformation. In these geometrical processes, an inner-product operation is frequently used because a matrix operation and a vector operation are performed. The inner-product operation is frequently used in not only the 3D-CG process described above, but also numerical calculations in conventional scientific and technical calculations. Realization of a multiply-add operating device which perform inner-product operations at a high speed is desired.

The configuration of a conventional floating point multiply-add operating device for performing an inner-product operation will be concretely described below. The configurations of the floating point multiply-add operating device are roughly classified into the following two types.

FIG. 1 shows the first configuration of a floating point multiply-add operating device. In the first configuration, a multiplier and an adder are mounted, and the multiplier and the adder are longitudinally connected to each other, or between which an operation result are bypassed as an operand so as to realize a multiply-add operation.

FIG. 2 shows the second configuration of a floating point multiply-add operating device. In the second configuration, an operating device is not divided into a multiplier and an adder, and a dedicated multiply-add operating device is directly constituted. In a graphic-dedicated machine in which a multiply-add operation occupies a large part of a whole process, the configuration of the second type is often employed. However, in a general MPU (microprocessing unit), the cost of the configuration in which the dedicated operating device is arranged is large. For this reason, the first configuration which is simple and has a good affinity with floating point operating devices in many MPUs is frequently employed.

The details of the processes of the first configuration will be described below. In the following description, it is assumed that all floating point operating devices conform to IEEE754 floating point standards which is operation standards of floating point numbers.

As shown in FIG. 1, a floating point multiply-add operating device of the first type is constituted by a multiplication unit 100 and a addition unit 200. The mantissa operating section of the multiplication unit 100 comprises a multiplication tree 101, a booth decoder 102, a final adder 103, a normalizing circuit 104, and registers 105 to 109. The exponent operating section of the multiplication unit 100 comprises two adders 110 and 111 and registers 112 and 115.

First, the configuration and operation of the multiplication unit 100 will be described below. In the multiplication unit 100, multiplication of the mantissa of an operand is executed first. Mantissas Fa and Fb of two floating point number operands are multiplied by the booth decoder 102 and the multiplication tree 101, and the final adder 103 calculates the final product of the mantissas. On the other hand, with respect to exponents, exponents Ea and Eb of two floating point number operands are added to each other by the adder 110.

Here, the exponents of the operands are subjected to biased representation. For this reason, to be exact, a biased value is subtracted from the sum of exponents calculated as described above to calculate the sum of exponents in the biased representation. In the following description, it is assumed that exponents are subjected to the biased representation.

If carry occurs in the mantissa as a result of the multiplication, normalization is performed. More specifically, a mantissa outputted from the final adder 103 is shifted by only one bit by means of the normalizing circuit 104. At the same time, an exponent outputted from the adder 110 is incremented by the adder 111.

FIG. 3 shows a procedure performed when the processes of the multiplication unit 100 are subjected to a pipeline process on two stages (stage X1 and stage X2). Multiplication is executed on the stage X1, and final addition and normalization are executed on the stage X2. More specifically, on the stage X1, the sum of the exponents of operands is calculated to be subjected to biased representation, and a product of mantissas is calculated. In FIG. 3, Ei represents a biased value. On the stage X2, the exponent of an operand obtained in (1) is incremented, and the final product of mantissas outputted from the final adder 103 is shifted to the right by one bit so as to normalized. The two stages shown in FIG. 3 indicate an example of a recent typical pipeline process. In FIG. 3, shift (X, n, r) represents that X is shifted to the right by n bits.

The configuration and operation of the adder 200 will be described below. The mantissa operating section of the addition unit 200 comprises a shifter 201 for performing alignment of operands Fm and Fn of mantissas, an adder 202 for calculating a sum of mantissas, a normalizing circuit 203, a preceding 0 detection circuit 204, and registers 205 to 209. The exponent operating section of the addition unit 200 comprises two adders 210 and 211, a selector 212, and registers 213 to 215. In the configuration of the addition unit 200, an addition process is performed according to the steps of: (1) calculation of an alignment shift count; (2) swap; (3) alignment; (4) addition or subtraction; (5) calculation of a normalization number; and (6) normalization.

(1) In the step of calculating an alignment shift count, an alignment shift count representing the number of bits to be shifted to perform alignment of the mantissas Fm and Fn of two operands is calculated. This alignment shift count is calculated as an absolute value of the difference between exponents Em and Ec of the two operands. The calculation of the alignment shift count is executed by the adder 210.

(2) In the swap step, a large one of the exponents Em and Ec of the two operands is selected as an intermediate value Ed of an addition operation by the selector 212 according to carry of an addition result of the adder 210. Next ,the mantissas Fm and Fn of the two operands are swapped as needed. Here, of the mantissas Fm and Fn of the two operands, the mantissa of the operand having a small one of the exponents Em and Ec must be input to the shifter 201 to perform alignment.

(3) In the alignment step, on the basis of a result of the calculation of an alignment shift count step (1), the mantissa of an operand having a small exponent is shifted to the right by a necessary number at the shifter 201, thereby performing alignment.

(4) In the addition or the subtraction, the mantissas of the two operands are added to each other by the adder 202.

(5) In the step of calculating a normalization number, the number of digits which are canceled as a result of the addition or the subtraction in step (4) is detected as a normalization number by counting the number of preceding zeros in the preceding 0 detection circuit 204.

(6) In the normalizing step, normalization is performed by the normalization number calculated in step (5). More specifically, in the exponent operating section, a normalization number N is subtracted from an intermediate value Ed of the exponent of the operand by the adder 211. In the mantissa operating section, the mantissa of an operand outputted from the adder 202 is shifted to the left by the normalization number by the normalizing circuit 203.

FIG. 4 shows a procedure performed when the processes of the addition unit 200 described above are subjected to a pipeline process on two stages (stage A1 and stage A2). The processes (1) to (3) are executed on the stage A1, and the processes (4) to (6) are executed on the stage A2. More specifically, on the stage A1, the absolute value of the difference between the exponents Em and Ec of the two operands is calculated as an alignment shift count S, a large one of the exponents Em and Ec of the two operands is selected as the intermediate value Ed of the exponents. Note that in FIG. 4, max(X, Y) represents that a large one of X and Y is selected. On the stage A1, the mantissas of the two operands are swapped as needed, and the mantissas are shifted by a number corresponding to an alignment shift count S. Note that shift (X, n, 1) represents that X is shifted to the left by n bits. On the stage A2, mantissas Fss and Fst of the two shifted operands are added or subtracted, and preceding zeros of an addition result Fs are counted to be set as the normalization number N. Note that PriorityEncode(X) represents that zeros on an MSB side of X are counted. On the stage A2, N is subtracted from the intermediate value Ed of the exponents, and the addition result Fs of the mantissas is shifted to the left. The two stages shown in FIG. 4 indicate an example of a recent typical pipeline process.

In order to perform a multiply-add operation by the first configuration described above in FIG. 1, the two multiplication units 100 and 200 have to be longitudinally connected to each other. When a multiply-add operation A×B+C (C is set as a result of the preceding multiply-add operation) is executed, two operands A and B are input to the multiplication unit 100 to be multiplied. The multiplication results are inputted as one of operands to the addition unit 200 by using paths indicated by *1 and *2 shown in FIG. 1, respectively. At this time, the operation results C of the preceding multiply-add operation is inputted as the other of the operands to the addition unit 200 by using paths indicated by *3 and *4 shown in FIG. 1. Accumulative addition of the exponent of the multiplication result of two operands A and B and the exponent of the operation result C of the preceding multiply-add operation and accumulative addition of the mantissa of the multiplication result of the two operands A and B and the mantissa of the operation result C of the preceding multiply-add operation are performed, respectively.

FIG. 5 shows an example of the flow of the pipeline processes in FIG. 3 and FIG. 4 in time series. As shown in FIG. 5, in the multiply-add operating device having the first configuration shown in FIG. 1, like the operation A×B+C, multiply-add operations having such dependence that a preceding operation result is used in a subsequent operation cannot be continuously executed. More specifically, a gap is formed in the pipeline processes between the preceding multiply-add operation (n−1) and the subsequent multiply-add operation n, so that the operation cannot be executed at a throughput "1". This is because an operation of floating point numbers generally requires a plurality of cycles, for example two cycles in the conventional art described above.

However, an inner-product operation frequently used in a graphic process, a numerical operation, or the like is generally realized by continuous multiply-add operations having dependence. In this case, when NOP (No Operation) serving as a state wherein an operation is not performed every multiply-add operation instruction occurs as shown in FIG. 5, operation efficiency is considerably degraded. This NOP can be reduced to some extent by scheduling instructions. However, the scheduling of instructions can be applied to only a case wherein there are instructions which has no dependency and which can fortunately bury the portion of the NOP. The scheduling is not effective to all continuous multiply-add operations.

When the throughput of a multiply-add operation is set to be "1" to solve the problem of such an idle state, the processes (1) to (6) must be executed by one cycle. In this case, critical paths are all the processes (1) to (6), and, therefore, a time required for one cycle is equal to a time taken to perform all the processes (1) to (6). This is a very long time, and is impractical.

Next, the details of the processes of the second configuration will be described below.

The mantissa operating section of the multiply-add operating device 300 comprises a multiplication tree 301 and a booth decoder 302 for calculating a product of mantissas Fa and Fb of first and second operands, a bidirectional shifter 303 for performing alignment of a third operand, an adder 304 for calculating a sum (sum of products) of a multiplication result and an alignment result obtained by the multiplication tree 301, a normalizing circuit 306 for normalizing a multiply-add operation result (i.e., product-sum) output from the adder 305, a preceding 0 detection circuit 307 for calculating a normalization number, and registers 308 to 313. The exponent operating section of the multiply-add operating device 300 comprises an adder 314 for calculating the value (i.e., sum of exponents) of a product of exponents Ea and Eb of the first and second operands, an adder 315 for calculating an alignment shift count S (i.e., difference between the exponent of the third operand and the exponent of the product of the first and second operands), a selector 316 for selecting one of the exponents of the third operand and the product of the first and second operands on the basis of carry of an operation result of the adder 315, an adder 317 for performing normalization, and registers 319 to 322. The selector 316 selects a large one of the exponent of the third operand and the exponent of the product of the first and second operands.

The multiply-add operating device 300 having the second configuration calculates sums of products at once. Multiply-add operations are executed by the following manner in the second embodiment.

The mantissas Fa and Fb of the first and second operands are inputted to the multiplication tree 301 and the booth decoder 302 for calculating the product of the first and second operands to be multiplied. With the multiplication process, the third operand is aligned by the bidirectional shifter 303. The direction of the shift and the number of bits by which the third operand is shifted are calculated as a difference between the sum of the exponents of the first and second operands and the exponent of the third operand. These alignment shift counts are calculated by the adders 314 and 315. Next, a large one of a sum of the exponents of the first and second operands and the exponent of the third operand is set as the intermediate value Ed of the exponents. A sum (sum of products) of alignment results between the product of the first and second operands and the third operand is calculated by the adder 304 and 305. The multiply-add operation result (product-sum) outputted from the adder 305 is normalized by the normalizing circuit 306. An alignment shift count representing the number of bits of shifting in the normalization is calculated by the preceding 0 detection circuit 307. In the exponent operating section, normalization is performed such that the normalization number N calculated by the preceding 0 detection circuit 307 is added to or subtracted from the intermediate value Ed of the exponents by the adder 317. The series of processes described above are exposed by, for example, the pipeline processes on two stages. The multiply-add operating device in FIG. 2 has the most typical configuration in the multiply-add operating device having the second configuration. Therefore, as shown in FIG. 2, as in the second configuration, the operation result of certain operands cannot used as an operand in the next operation before two clock interval. More specifically, multiply-add operations having dependence cannot be executed only every two clocks, the same drawback as in the multiply-add operating device having the first configuration in FIG. 1 is caused.

In this manner, a conventional floating point multiply-add operating device, unlike an integer multiply-add operating device, has a long latency and does not execute, especially, multiply-add operations having dependence every clock, so that an operating time is disadvantageously long.

SUMMARY OF THE INVENTION

The present invention has been made to solve the above problem. It is an object of the present invention to provide a multiply-add operating device for a floating point number in which, in an accumulative addition process or an accumulative subtraction process in repetitive execution of continuous multiply-add operations, calculation of an alignment shift count required in an alignment process of an accumulation process of a subsequent multiply-add operation is started before a normalization process is finished, and the alignment shift count is calculated simultaneously with the normalization process, so that a critical path of the multiply-add operations is shortened to improve operation efficiency.

According to a certain characteristic feature of the present invention, as shown in FIG. 6, a device for performing a multiply-add operation in which multiplication of floating point numbers consisting of mantissas and exponents and accumulative addition or accumulative subtraction of results of the multiplication are performed, comprising:

an exponent operating section for comparing an exponent of a floating point number of an operation result of a preceding multiply-add operation n with an exponent of a multiplication result of a subsequent multiply-add operation (n+1), and calculating an alignment shift count of the multiply-add operation (n+1) by the comparison result, the alignment shift count is obtained by starting calculation of the alignment shift count of the subsequent multiply-add operation (n+1) before normalization of the preceding multiply-add operation n is finished; and a mantissa operating section for aligning one mantissa of mantissas of two operands according to the alignment shift count inputted from the exponent operating section, calculating a sum of an aligned mantissa of the operand and the mantissa of the other operand, and normalizing a calculated addition result of the calculated mantissas as needed, thereby calculating a mantissa of the multiply-add operation (n+1).

This exponent operating section performs calculation in two phases. More specifically, the exponent operating section includes:

a first alignment controller for calculating a difference between an intermediate value between an exponent of an operation result of the preceding multiply-add operation n and an exponent $Em(n+1)$ of a multiplication result of the subsequent multiply-add operation (n+1); and a second alignment controller for subtracting a normalization number N of the multiply-add operation (n+1) from a calculation result in the first alignment controller.

The configuration of the floating point multiply-add operating device, the device for performing a multiply-add operation in which multiplication of floating point numbers consisting of mantissas and exponents and accumulative addition or accumulative subtraction of results of the multiplication are performed, comprising:

a multiplication unit for performing multiplication of two operands consisting of mantissas and exponents; and an addition unit, constituted by an exponent operating section and a mantissa operating section, for performing an accumulating process of multiplication results of the multiplication unit;

wherein:

the exponent operating section includes:

a first alignment controller for calculating a difference between an intermediate value between an exponent of an operation result of the preceding multiply-add operation n and an exponent $Em(n+1)$ of a multiplication result of the subsequent multiply-add operation (n+1); and a second alignment controller for subtracting a normalization number N of the multiply-add operation (n+1) from a calculation result in the first alignment controller so as to calculate an alignment shift count.

The exponent operating section may further include:

a selector for selecting a large one of the intermediate value and the $Em(n+1)$ as an intermediate value Ed of the accumulating process of the multiply-add operations on the basis of control of the second alignment controller; and an exponent normalizing section for subtracting the normalization number N from the intermediate value Ed selected by the selector so as to calculate the exponents of the operands of the multiply-add operations.

The mantissa operating section may include:

a shifter for performing alignment of one of a mantissa of the operand of the operation result of the preceding multiply-add operation n and a mantissa of an output from the multiplication unit of the subsequent multiply-add operation (n+1) according to the alignment shift count output from the second alignment controller;

an accumulating processing operating section for performing an accumulating process of a mantissa of an operand aligned by the shifter and a mantissa of the other operand;

a normalization number calculating section for detecting a number of canceled digits of a process result outputted from the accumulating processing section so as to calculate the normalization number N; and a normalizing unit for normalizing the process result outputted from the accumulating processing section according to the normalization number N outputted from the normalizing number calculating section.

Other features and advantages of the present invention will become apparent from the following description taken in conjunction with the accompanying drawings.

BRIEF DESCRIPTION OF THE DRAWINGS

FIG. 3 is a chart for explaining process contents in a multiplication unit of the floating point multiply-add operating device in FIG. 1;

FIG. 4 is a chart for explaining process contents in an addition unit of the floating point multiply-add operating device in FIG. 1;

FIG. 5 is a chart for explaining a procedure of floating point multiply-add operations continuing on pipeline processes in the conventional art;

FIG. 7 is a chart for explaining an example of a procedure of floating point multiply-add operations continuing on the pipeline processes according to the embodiment of the present invention;

FIG. 8 is a chart for explaining an example of an operation timing of an addition process in the conventional art;

FIG. 9 is a chart for explaining an example of operation timing of an addition process according to the embodiment of the present invention;

FIG. 10 is a chart for explaining a critical path of an addition process of a multiply-add operation in the conventional art;

FIG. 11 is a chart for explaining a critical path of an addition process of a multiply-add operation according to the embodiment of the present invention.

DETAILED DESCRIPTION OF THE PREFERRED EMBODIMENTS

Now, a multiply-add operating device for a floating point number according to the present invention will be described below with reference to FIG. 6 to FIG. 12.

This embodiment provides a function for increasing the throughput of an addition process of multiply-add operations by starting calculation of an alignment shift count of a subsequent instruction before a normalizing process of a preceding instruction is finished in multiply-add operations of floating point numbers.

Figure 6:
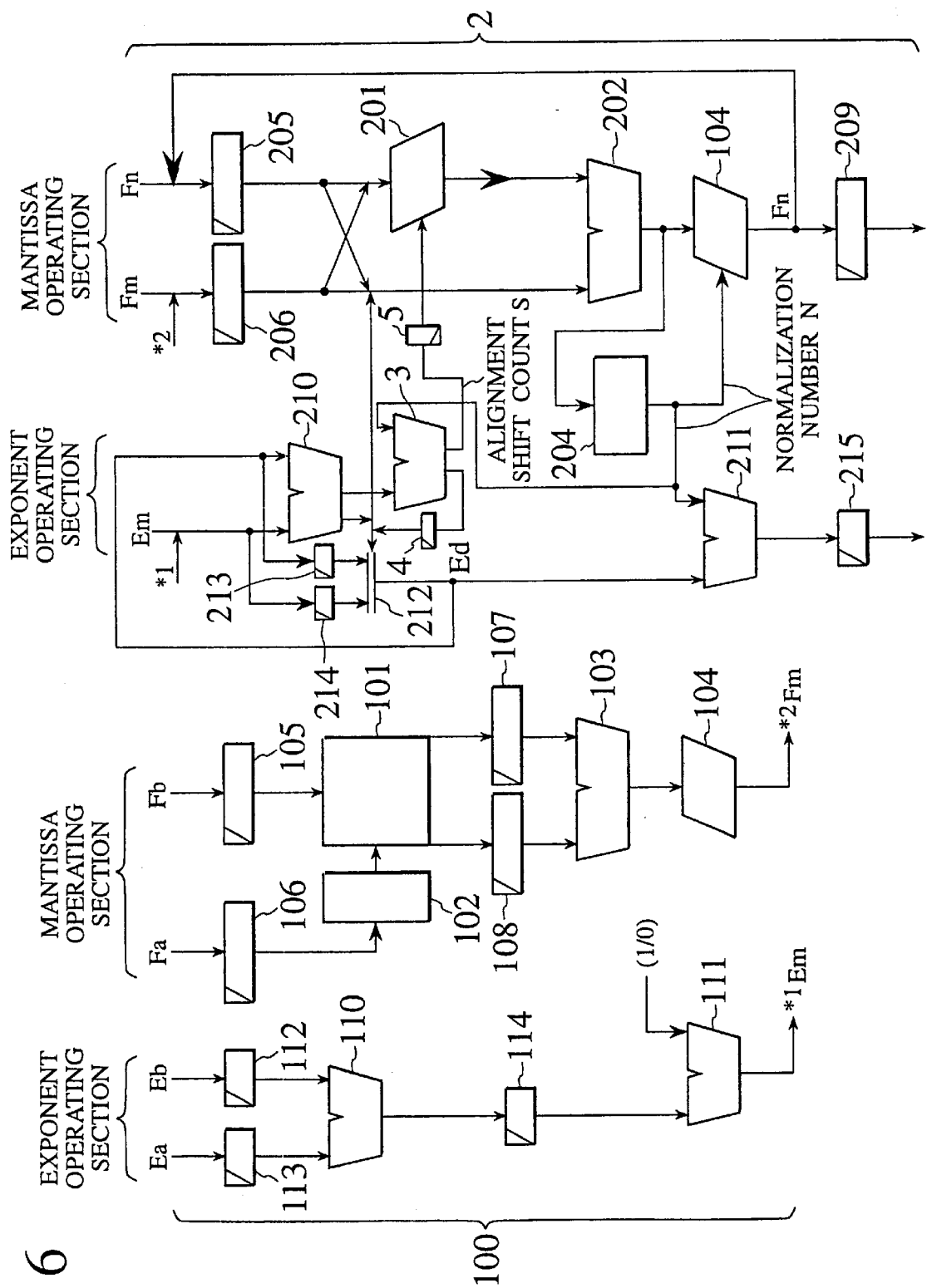
FIG. 6 is a block diagram showing the configuration of a floating point multiply-add operating device according to the embodiment of the present invention.
Figure 12:
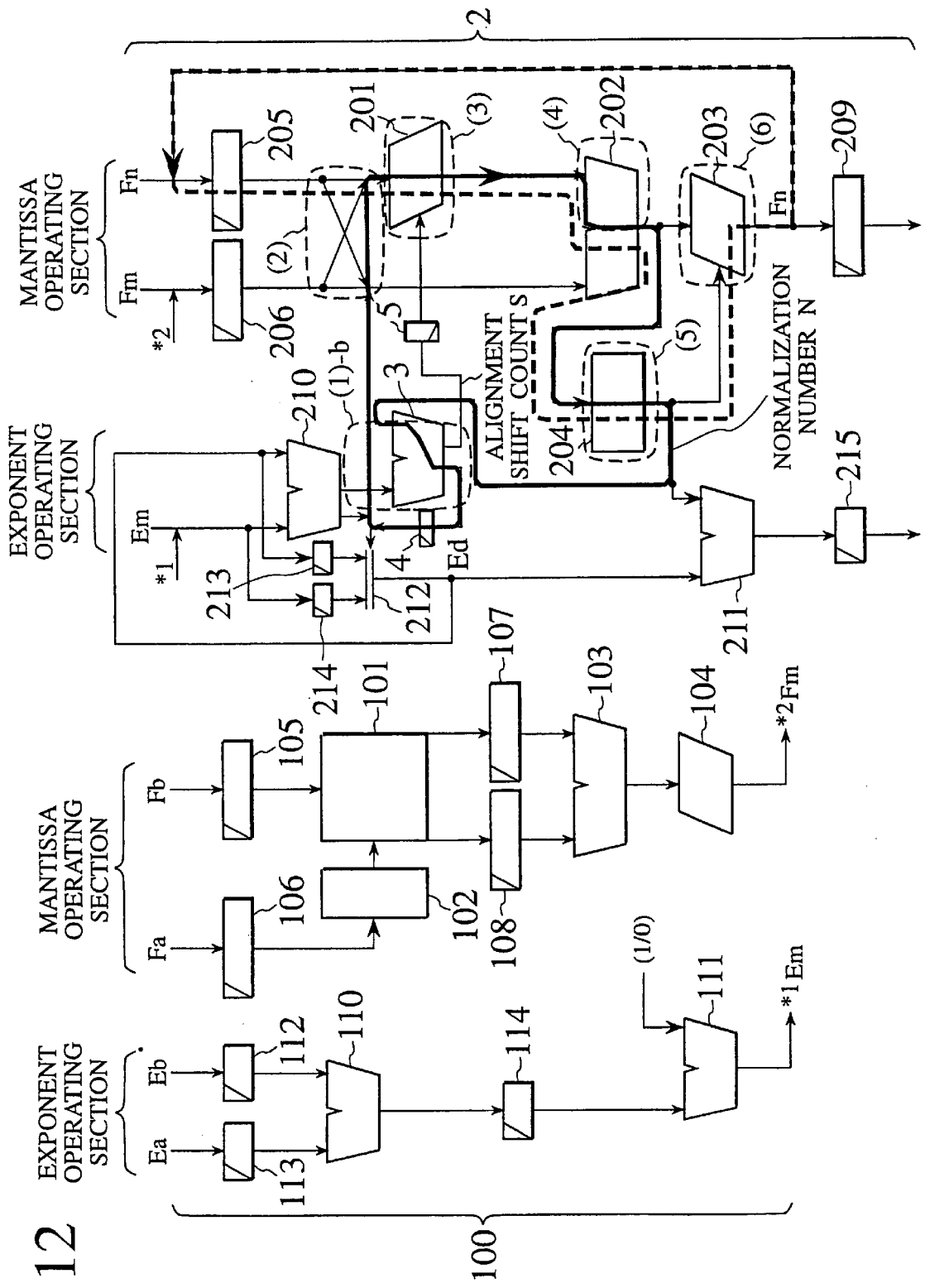
FIG. 12 is a block diagram for explaining correspondence between the critical path in FIG. 11 and the configuration of the floating point multiply-add operating device in FIG. 6.

FIG. 6 is a block diagram showing the configuration of a multiply-add operating device for a floating point number according to the embodiment of the present invention. In the following description, it is assumed that all floating point multiply-add operating devices conform to IEEE754 floating point standards which is an operation standard of floating point numbers. Although an accumulating process in an addition unit is described by using an addition process as an example, this embodiment can also be applied to a subtraction process.

As shown in FIG. 6, a floating point multiply-add operating device of the first type is constituted by a multiplication unit 100 and a addition unit 2. The mantissa operating section of the multiplication unit 100 comprises a multiplication tree 101, a booth decoder 102, a final adder 103, a normalizing circuit 104, and registers 105 to 108. The exponent operating section of the multiplication unit 100 comprises two adders 110 and 111 and registers 112 to 114. The configuration and operation of the multiplication unit 100 can be made basically equal to those of the floating point multiply-add operating device in FIG. 1. For this reason, the remaining description of the multiplication unit 100 will be omitted.

The mantissa operating section of the addition unit 2 of the floating point multiply-add operating device according to this embodiment comprises a shifter 201 for performing alignment of operands Fm and Fn of mantissas, an adder 202 for calculating a sum of mantissas, a normalizing circuit 203, a preceding 0 detection circuit 204, and registers 205, 206, and 209. The exponent operating section of the addition unit 2 comprises three adders 210, 3, and 211, a selector 212, and registers 213 to 215 and 4 and 5. Note that the operands Fm and Fn may be fractions.

Figure 1:
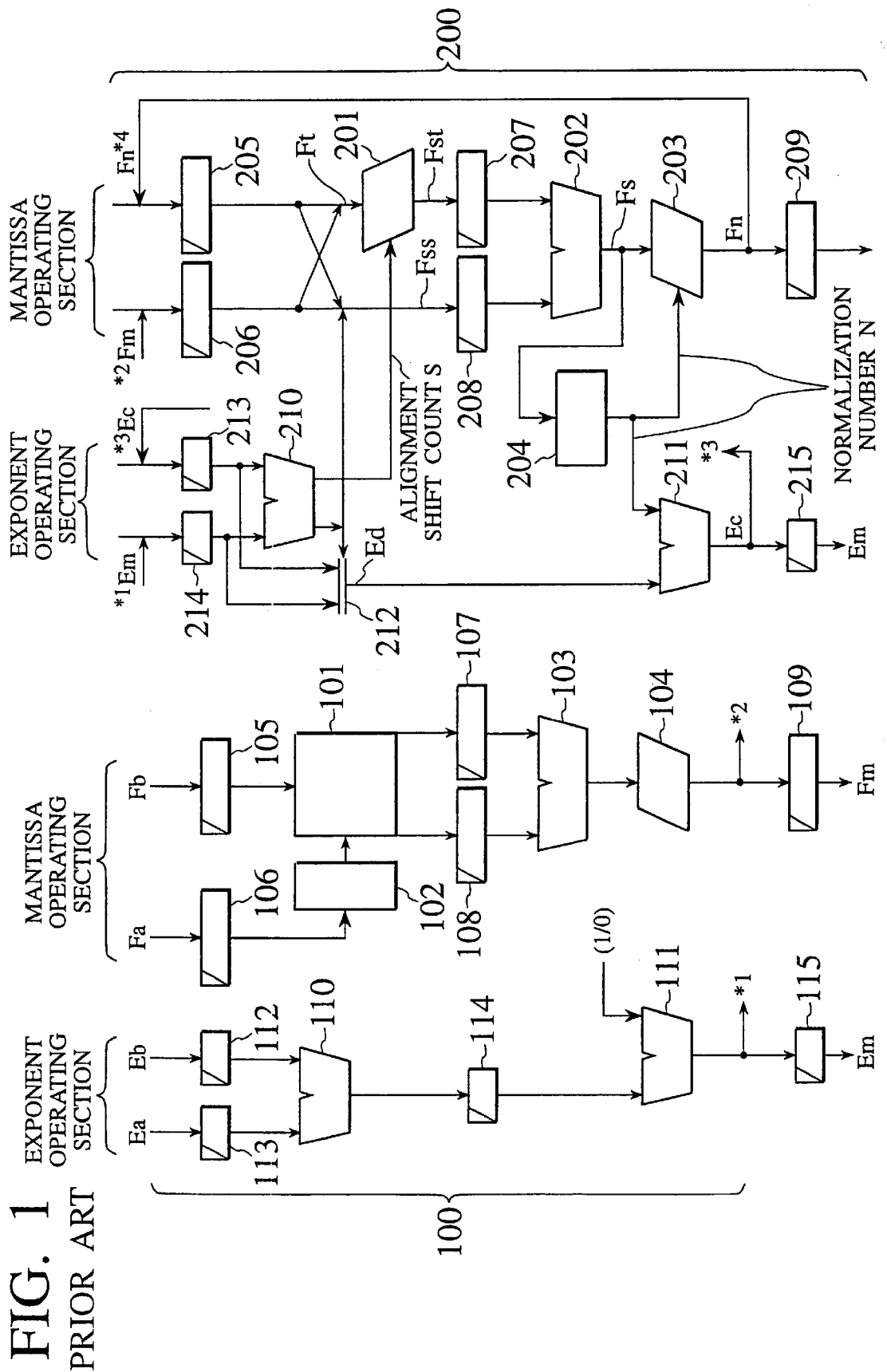
FIG. 1 is a block diagram showing an example of the configuration of a floating point multiply-add operating device in a conventional art.

In this embodiment, in comparison with the configuration of the floating point multiply-add operating device shown in FIG. 1, the adder 3, the register 4, and the register 5 are added to the addition unit 2. An output from the selector 212 is given to one of the inputs of the adder 210.

The adder 3 performs subtraction between an addition result of exponents outputted from the adder 210 and a normalization number N obtained by the preceding 0 detection circuit 204 to calculate an alignment shift count S. The register 5 holds the calculated alignment shift count S. The shifter 201 of the mantissa operating section performs shift control to one of the mantissas of two operands according to the alignment shift count S held by the register 5. The register 4 holds carry of the addition result from the adder 3. By the carry held by the register 4, selection of exponents of operands in the selector 212 and a swap operation in the mantissa operating section are controlled. In FIG. 6, it is assumed that the units indicated by the same reference numerals as those in the conventional art shown in FIG. 1 have the same functions as those of the corresponding units in FIG. 1.

The floating point multiply-add operating device according to this embodiment is constituted by the multiplication unit 100 and the addition unit 2, and, as described above, the floating point multiply-add operating device and the conventional multiply-add operating device shown in FIG. 1 have many parts in common. An addition process in the addition unit 2, as in the floating point multiply-add operating device of the prior art described above, is performed according to the steps of: (1) calculation of an alignment shift count; (2) swap; (3) alignment; (4) addition or subtraction; (5) calculation of a normalization number; and (6) normalization.

(1) In the step of calculating an alignment shift count, an alignment shift count representing the number of bits to be shifted to perform alignment of the mantissas Fm and Fn of two operands is calculated. This alignment shift count is calculated as an absolute value of the difference between exponents of the two operands. In this embodiment, first, the alignment shift count is obtained as the absolute value of a difference between an intermediate value Ed outputted from the selector 212 and the exponent Em of a multiplication result of an exponent output from the multiplication unit 100, and then this value is normalized using the normalization number N. That is, in this embodiment, calculation of the alignment shift count is executed by the adder 210 and the adder 3 in two phases (steps (1)-a and (1)-b (to be described later).

(2) In the swap step, a large one of the exponents Em and Ed of the two operands is selected as an intermediate value Ed of an addition operation by the selector 212 according to carry of an addition result of the adder 3. The mantissas Fm and Fn of the two operands are swapped as needed. Here, the mantissas Fm and Fn are swapped such that the mantissa of an operand (of the two operands) having a small one of the exponents Em and Ed is inputted to the shifter 201.

(3) In the alignment step, on the basis of a result of the calculation of an alignment shift count step (1), the mantissa of an operand having a small exponent is shifted to the right by a necessary number, thereby performing alignment.

(4) In the addition or the subtraction, the mantissas of the two operands are added to each other by the adder 202.

(5) In the step of calculating a normalization number, the number of digits which are canceled as a result of the addition or the subtraction in step (4) is detected as a normalization number N by counting the number of preceding zeros in the preceding 0 detection circuit 204.

(6) In the normalizing step, normalization is performed using the normalization number N calculated in step (5). More specifically, in the exponent operating section, the normalization number N is subtracted from the intermediate value Ed of the exponent of the operand by the adder 211. This normalization number N is supplied to the adder 3, and a difference between the normalization number N and an output from the adder 210 is calculated. The result is set as an alignment shift count S. In the mantissa operating section, the mantissa of an operand output from the adder 202 is shifted to the left by the normalization number N by the normalizing circuit 203.

In the floating point multiply-add operating device according to this embodiment shown in FIG. 6, the pipeline processes are constituted by, for example, three stages, i.e., a stage X, a stage Y, and a stage Z. The stage X is constituted by the multiplication tree 101 in the mantissa operating section of the multiplication unit 100, a booth decoder 102, and the adder 110 in the exponent operating section. The stage Y is constituted by the final adder 103 in the mantissa operating section of the multiplication unit 100, the normalizing circuit 104, the adder 111 in the exponent operating section, and the two adders 210 and 3 in the exponent operating section of the addition unit 2. The stage Z is constituted by the shifter 201 for performing alignment of operands of mantissas in the addition unit 2, the adder 202 for calculating a sum, the normalizing circuit 203, the preceding 0 detection circuit 204, the selector 212 in the exponent operating section, and the adder 211.

The adder 3 added to the addition unit 2 is an operating unit for calculating an alignment shift count S for a subsequent multiply-add operation before normalization of a current multiply-add operation is finished. The multiply-add operating device in FIG. 6 is constituted by three stages. However, the configuration of the multiply-add operating device according to the first embodiment is not limited to the three stages, and the multiply-add operating device can be arbitrarily constituted by adding or removing a register.

The operation of the floating point multiply-add operating device according to this embodiment will be described below with reference to FIG. 7 to FIG. 12. In this case, in particular, the operation of the process, which is an accumulative addition process in the addition unit 2, in the second half of the stage Y and the Z stage will be mainly described below.

On the stage X, multiplication is performed in the same manner as that of the conventional art. Multiplication of operands Fa and Fb of the mantissas are executed by the booth decoder 102 and the multiplication tree 101. On the other hand, a multiplication result of the exponents of the operands is calculated such that the exponents of two operands Ea and Eb are added to each other by using the adder 110. More exactly, since the exponents are subjected to biased representation, a sum of the exponents is calculated, and a biased value is subtracted from the sum of the exponents to calculate the multiplication result.

On the stage Y, a final product is calculated by the final adder 103. When carry occurs in the mantissa of an operand, the mantissa of the operand is shifted by only one bit, and the exponent of the operand is incremented to perform normalization. In addition, on the stage Y, calculation of alignment shift count step (1) in the addition process is performed. This calculation is performed in two steps by the adders 210 and 3 for two exponents. On the stage Z, (2) swap step, (3) alignment step, (4) addition or subtraction step, (5) calculation of a normalization number step, and (6) normalization step are performed.

FIG. 7 is a timing chart obtained when the multiply-add operations having dependence are continuously executed. As shown in FIG. 7, the floating point multiply-add operating device according to this embodiment executes the continuous multiply-add operations at a throughput "1".

FIG. 8 is a chart showing an operation timing of an addition process performed by the addition unit 200 in the multiply-add operation of the conventional art. FIG. 9 is a chart showing an operation timing of an addition process performed by the addition unit 2 in a multiply-add operation of this embodiment.

Referring to FIG. 7, it is assumed that an addition process of a multiply-add operation n is being executed on the stage Z at a present time T. At this time, in a subsequent multiply-add operation (n+1), final addition of multiplication on the stage Y and calculation of an alignment shift count S for performing alignment in the addition process on the stage Z at the next time (T+1) are performed.

The continuous multiply-add operations in FIG. 7 are executed as follows.

Preceding instruction: multiply-add operation (n−1) A'←A+B×C

Present instruction: multiply-add operation n A"←A'+D×E

Subsequent instruction:

(n+1) A'"←A"+F×G

In the continuous multiply-add operations, the alignment shift count S is obtained, at time (T+1), by subtracting a value Em(n+1) of an exponent of a product of the multiply-add operation (n+1) calculated at time T from the value of an exponent En of the multiply-add operation n calculated on the stage Z at time T. Em(n+1) represents the value of Em in the subsequent multiply-add operation (n+1) of the present multiply-add operation n hereinafter. This is because, since the value En of the exponent of the operand of the multiply-add operation n is calculated by subtracting the normalization number N calculated by the preceding 0 detection circuit 204 from the intermediate value Ed of the exponent by the adder 211, En is fixed at the end of time T. More specifically, the alignment shift count S is calculated by the procedure performed by the following equations (1) and (2):

$$\text{Time T: } En = Ed - N \quad (1)$$

$$\text{Time } (T+1): S = En - Em(n+1) \quad (2)$$

On the other hand, in this embodiment, the operations of the equations (1) and (2) are not started at time (T+1), but the operations are started at the first half of time T at which the result of the exponent of the multiply-add operation n is not fixed. The formula for obtaining the alignment shift count S can be deformed as expressed by the following equation (3) by the equations (1) and (2) described above.

$$S = (Ed - N) - Em(n+1) \quad (3)$$
$$= (Ed - Em(n+1)) - N$$

In this case, although N is fixed at only the second half of time T, Ed and Em(n+1) is fixed in a relatively early period at time T. In this embodiment, the order of operations is changed as expressed by the equation (3), (Ed−Em(n+1)) is executed by the adder 210 first. Thereafter, immediately after the normalization number N is calculated, the adder 3 subtracts the normalization number N from an output result from the adder 210 to calculate the alignment shift count S.

In this case, it is assumed that (1)-a represents execution of (Ed−Em(n+1)) in calculation of the alignment count, and it is assumed that (1)-b represents execution of (Ed−Em(n+1))−N in execution of the alignment shift count.

On the stage Z, (2) swap step, (3) alignment step, (4) addition or subtraction step, (5) calculation step of a normalization number, and (6) normalizing step are executed. In (2) swap step and (3) alignment step, a large one of the exponents of two operands is selected by the selector 212 as the intermediate value Ed of an addition operation. In the mantissa operating section, in order to transmit the mantissa of an operand (one of the operands) having a small exponent to the shifter 201 to perform alignment, the operands are replaced with each other if necessary. In the shifter 201, the mantissa of the operand having a small exponent is shifted to the right by a necessary number, thereby performing alignment. The process in step (3) is performed on the basis of the alignment shift count S calculated on the stage Y in advance. The intermediate value Ed of the selected exponent is transferred to the adder 210 to calculate the alignment shift count of the subsequent multiply-add operation (n+2). In step (4) addition/subtraction step the adder 202 performs addition operation of the mantissa. In (5), normalization number calculation step, the number of digits canceled in the result of (4) addition/subtraction is detected by counting the number of preceding zeros by the preceding 0 detection circuit 204, thereby calculating the normalization number N. The normalization number N is transferred to the adder 3 to calculate an alignment shift count of the subsequent multiply-add operation (n+2). In (6) normalizing step, normalization is performed by a result of (5). More specifically, the normalization number N is subtracted from the intermediate value Ed of the exponent by the adder 211 in the exponent operating section, and the mantissa is shifted to the left by the normalization number N in the mantissa operating section by the shifter 203.

As shown in FIG. 8, in the floating point multiply-add operating device of the conventional art, unless the normalization process of the preceding multiply-add operation n is finished, an alignment shift count calculating process of the subsequent multiply-add operation (n+1) cannot be started. On the other hand, as shown in FIG. 9, in the floating point multiply-add operating device according to this embodiment, before the normalization process of the preceding multiply-add operation n is finished, the alignment shift count calculating process of the subsequent multiply-add operation (n+1) is started. More specifically, as shown in FIG. 9, alignment shift count calculation (1)-a is executed in the adder 210 first, and then alignment shift count calculation (1) -b is executed in the adder 3 after the normalization number N supplied from the mantissa operating section is obtained.

FIG. 10 is a chart for explaining a critical path of continuous multiply-add operations of the conventional art. FIG. 11 is a chart for explaining a critical path of continuous multiply-add operations in this embodiment.

In this embodiment, in order to set the throughput of multiply-add operations having dependence to be "1" as shown in FIG. 7, the critical path of an accumulative addition process in the continuous multiply-add operations is shortened. In the configuration of the multiply-add operating device of the conventional art shown in FIG. 1, the critical path of the accumulative addition process in the continuous multiply-add operations is given by (1) alignment shift count calculation step→(2) swap step→(3) alignment step→(4) addition or subtraction step→(5) normalization number calculation step (6) normalization step as shown in the manner of execution of the accumulative addition in FIG. 10. More specifically, until the processes (1) to (6) are finished, the next accumulative addition cannot be executed. On the other hand, in the configuration of this embodiment shown in FIG. 6, two portions constitute loops in the addition unit 2 are indicated by a solid line and a broken line in FIG. 12. More specifically, in the configuration of the first embodiment, the critical path of the accumulative addition process in the continuous multiply-add operations is given by (1)-b execution of (Ed −Em(n+1))−N in alignment shift count calculation step→(2) swap step (3) alignment step→ (4) addition or subtraction step→(5) normalization number calculation step, otherwise, (2) swap step→(3) alignment step→(4) addition or subtraction step→(5) normalization number calculation step→(6) normalization step. This is because, since alignment count calculation of (1)-a is executed in advance in this embodiment, the calculation can be executed simultaneously with the normalization process. More specifically, as shown in FIG. 11, (1) calculation of an alignment count process and (6) normalization process are simultaneously executed. The configuration in FIG. 6 is an example of this embodiment, and the critical path varies depending on the configuration. For example, a configuration in which a swap process and alignment process are realized can be realized by a configuration different from the configuration in FIG. 6. A manner of giving a control signal to the swap process and the alignment process can be realized by a configuration different from the configuration in FIG. 6. In the configuration in FIG. 6, although control signals to a swap portion and the shifter 201 for performing alignment are supplied from the adder 3 through the register 4 or the register 5, these signals can be generated by different constituent units. The swap process and the alignment process may be simultaneously performed by one constituent unit, or the same process as the swap process can also be performed after alignment.

Figure 2:
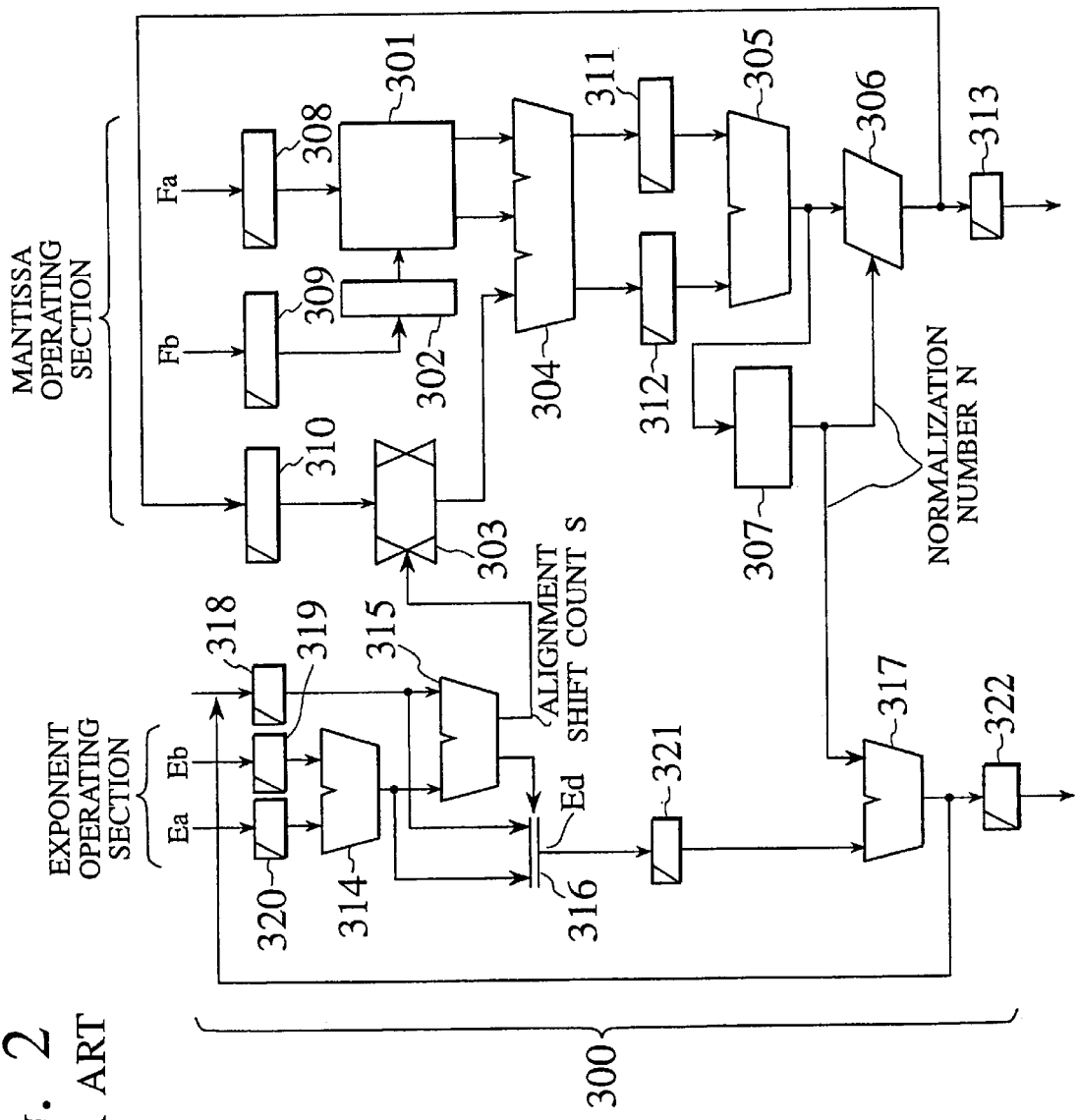
FIG. 2 is a block diagram showing another example of the configuration of the floating point multiply-add operating device in the conventional art.

As described above, according to this embodiment, before the normalization process of the preceding multiply-add operation is finished, execution of calculation of an alignment shift count required to the subsequent multiply-add operation is started simultaneously with the normalization process. For this reason, the efficiency of simultaneous execution of the processes is improved, and the critical path of the accumulative addition process in continuous multiply-add operations is shortened. Therefore, the critical path used when the multiply-add operating device having a throughput of "1" can be shortened, and the operation time of the floating point multiply-add operation can be considerably shortened in comparison with the operation time in the conventional art. The embodiment of the present invention can also be applied to the second configuration of the conventional art in FIG. 2 such that the embodiment is properly changed.

In summary, as has been described above, according to the present invention, before the normalization process of the preceding multiply-add operation is finished, execution of calculation of an alignment shift count required for the subsequent multiply-add operation is started simultaneously with the normalization process. For this reason, the efficiency of simultaneous execution of the processes is improved, and the critical path of an addition (accumulation) process in continuous multiply-add operations is shortened, so that the efficiency of the multiply-add operation process of a floating point number is improved.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A device for performing a multiply-add operation in which multiplication of floating point numbers consisting of mantissas and exponents and accumulative addition or accumulative subtraction of results of the multiplication are performed, comprising:

an exponent operating section for comparing an exponent of a floating point number of an operation result of a preceding multiply-add operation n with an exponent of a multiplication result of a subsequent multiply-add operation (n+1), and calculating an alignment shift count of the multiply-add operation (n+1) by the comparison result, the alignment shift count is obtained by starting calculation of the alignment shift count of the subsequent multiply-add operation (n+1) before normalization of the preceding multiply-add operation n is finished; and a mantissa operating section for aligning one mantissa of mantissas of two operands according to the alignment shift count inputted from the exponent operating section, calculating a sum of an aligned mantissa of the operand and the mantissa of the other operand, and normalizing a calculated addition result of the mantissas as needed, thereby calculating a mantissa of the multiply-add operation (n+1).

2. The device of claim 1, wherein the exponent operating section performs calculation of the alignment shift count in two phases.

3. The device of claim 1, wherein the exponent operating section includes:

a first alignment controller for calculating a difference between and intermediate value an exponent of an operation result of the preceding multiply-add operation n and an exponent Em(n+1) of a multiplication result of the subsequent multiply-add operation (n+1); and a second alignment controller for subtracting a normalization number N of the multiply-add operation (n+1) from a calculation result in the first alignment controller.

4. A device for performing a multiply-add operation in which multiplication of floating point numbers consisting of mantissas and exponents and accumulative addition or accumulative subtraction of results of the multiplication are performed, comprising:

an exponent operating section for comparing an exponent of a floating point number of an operation result of a preceding multiply-add operation n with an exponent of a multiplication result of a subsequent multiply-add operation (n+1), and calculating an alignment shift count of the multiply-add operation (n+1) by the comparison result; and a mantissa operating section for aligning one mantissa of mantissas of two operands according to the alignment shift count inputted from the exponent operating section, calculating a sum of an aligned mantissa of the operand and the mantissa of the other operand, and normalizing a calculated addition result of the mantissas as needed, thereby calculating a mantissa of the multiply-add operation (n+1), wherein the exponent operating section includes:

a first alignment controller for calculating a difference between an intermediate value of an exponent of an operation result of the preceding multiply-add operation n and an exponent Em(n+1) of a multiplication result of the subsequent multiply-add operation (n+1); and a second alignment controller for subtracting a normalization number N of the multiply-add operation (n+1) from a calculation result in the first alignment controller.

5. A device for performing a multiply-add operation in which multiplication of floating point numbers consisting of mantissas and exponents and accumulative addition or accumulative subtraction of results of the multiplication are performed, comprising:

a multiplication unit for performing multiplication of two operands consisting of mantissas and exponents; and an addition unit, constituted by an exponent operating section and a mantissa operating section, for performing an accumulating process of multiplication results of the multiplication unit;

wherein the exponent operating section includes:

a first alignment controller for calculating a difference between an intermediate value of an exponent of an operation result of a preceding multiply-add operation n and an exponent Em(n+1) of a multiplication result of a subsequent multiply-add operation (n+1); and a second alignment controller for subtracting a normalization number N of the multiply-add operation (n+1)

from a calculation result in the first alignment controller to calculate an alignment shift count.

6. The device of claim 5, wherein the exponent operating section includes:

a selector for selecting a large one of the intermediate value and the Em(n+1) as a intermediate value Ed of the accumulating process of the multiply-add operations on the basis of control of the second alignment controller; and an exponent normalizing section for subtracting the normalization number N from the intermediate value Ed selected by the selector so as to calculate the exponents of the operands of the multiply-add operations.

7. The device of claim 5, wherein the mantissa operating section includes:

a shifter for performing alignment of one of a mantissa of the operation result of the preceding multiply-add operation n and a mantissa of an output from the multiplication unit of the subsequent multiply-add operation (n+1) according to the alignment shift count outputted from the second alignment controller;

an accumulating processing section for performing addition or subtraction of the significant of the operand aligned by the shifter and the significant of the other operand;

a normalization number calculating section for detecting a number of canceled digits of a process result outputted from the accumulating processing section so as to calculate the normalization number N; and a normalizing unit for normalizing the process result output from the accumulating processing section according to the normalization number N outputted from the normalization number calculating section.

8. The device of claim 6, wherein the mantissa operating section includes:

a shifter for performing alignment of one of a mantissa of the operand of the operation result of the preceding multiply-add operation n and a mantissa of an output from the multiplication unit of the subsequent multiply-add operation (n+1) according to the alignment shift count outputted from the second alignment controller;

an accumulating processing section for performing addition or subtraction of the significant of the operand aligned by the shifter and the significant of the other operand;

a normalization number calculating section for detecting a number of canceled digits of a process result outputted from the accumulating processing section so as to calculate the normalization number N; and a normalizing unit for normalizing the process result outputted from the accumulating processing section according to the normalization number N outputted from the normalization number calculating section.

* * * * *